June 4, 1963   J. HOHLA   3,092,326
TRACK SUPPORT

Filed Nov. 30, 1961   2 Sheets-Sheet 1

JOHANNES HOHLA
INVENTOR.

BY

AGENT

June 4, 1963
J. HOHLA
3,092,326
TRACK SUPPORT
Filed Nov. 30, 1961
2 Sheets-Sheet 2
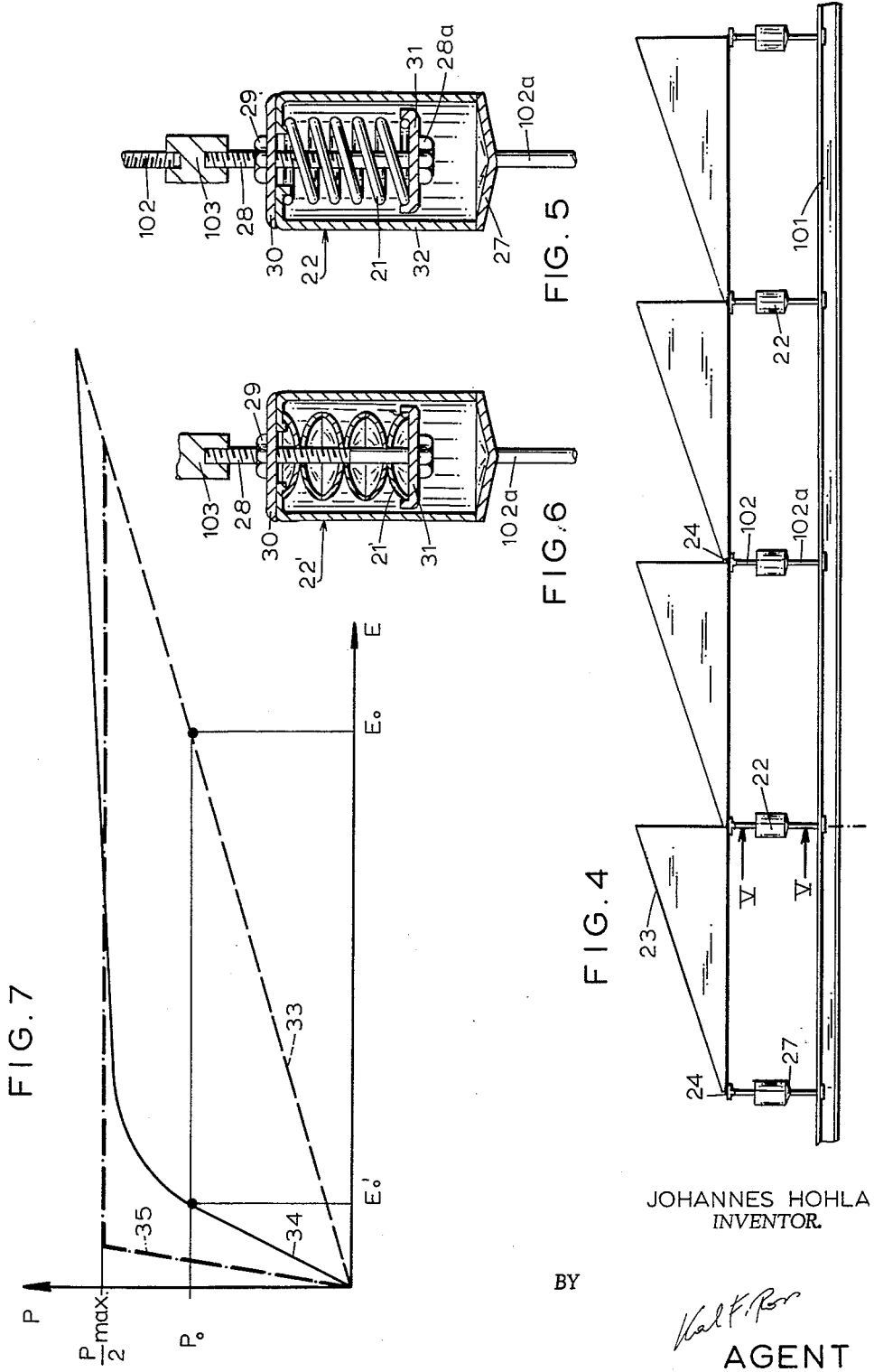
JOHANNES HOHLA
INVENTOR.
BY
AGENT

United States Patent Office 3,092,326
Patented June 4, 1963

3,092,326
TRACK SUPPORT
Johannes Hohla, Moorenstrasse 24, Essen, Germany
Filed Nov. 30, 1961, Ser. No. 155,988
Claims priority, application Germany Dec. 2, 1960
8 Claims. (Cl. 238—119)

The present invention relates to a system for supporting generally horizontal beams, rails and other elastically deformable members used as tracks for rolling or otherwise movable loads, particularly in elevated or suspended track structures for traveling cranes.

Most elevated or suspended track structures are rigidly fastened to their supports so that, whenever a load passes over or below a support, the latter must bear the entire weight thereof. This necessitates dimensioning each support for the maximum load and requires massive structures with high buckling resistance, thereby ruling out slender columns or thin suspension rods in many instances.

The general object of my invention is to provide a track-mounting system that will at all times distribute the weight of the load over a number of supports, thus permitting the use of smaller, lighter, less expensive structures.

A more particular object of this invention is to provide an improved track support for rolling loads, such as overhead trucks or cranes, adapted to be used in industrial installations.

The principal feature of my invention is the provision of a yieldable coupling between a generally horizontal track member and each of its supports whereby the latter will allow a limited downward deflection under load, with resulting distribution of the weight of the load over a plurality of neighboring supports.

The yieldable coupling may incorporate a variety of means including, for example, resilient, pneumatic and/or hydraulic balancing elements. Weights, i.e. the force of gravity, can also be utilized, e.g. for the purpose of providing a counteracting or balancing force which is substantially independent of load pressure; in accordance with a specific feature of the invention, however, a counteracting force varying substantially proportionally with load pressure can be produced by partially or completely immersing a counterweight body in a liquid whereby, upon a progressive lifting of this body above the liquid level, its effective weight will increase.

In general it will be desirable to limit the stroke of the yieldable coupling so that a load exceeding a certain weight, upon approaching or passing a support, will bear directly on the latter. Even so, however, the weight of the load will be only partly absorbed by that particular support while the remainder of the weight will be carried by adjacent supports. In many instances it will, therefore, be advantageous to design each support so that it will be able to sustain a substantial fraction, e.g. one-half, of the expected maximum load and to bias the coupling in such manner that it will yield to downward pressure only if the same exceeds a value close to that fraction; when yielding commences, the support under consideration will be under a pressure which increases only slightly, if at all, above the value of the biasing force as the weight of the load is distributed between this support and its neighbors.

The term "support," as applied to the present invention, is intended to embrace both compression elements below the track, such as bearing columns or blocks, and tension elements above the track, such as suspension rods.

The above and other objects and features of my invention will become more fully apparent from the following detailed description, reference being made to the accompanying drawing in which:

FIG. 4 is a side view of a suspended track structure according to the invention forming part of an overhead transportation system;

FIG. 5 is an enlarged cross-sectional view of a spring coupling taken on the line V—V of FIG. 4;

FIG. 6 is a view similar to FIG. 5, illustrating a modified spring coupling; and FIG. 7 is a graph representing the spring characteristics of the couplings of FIGS. 3, 5 and 6.

Figure 1:
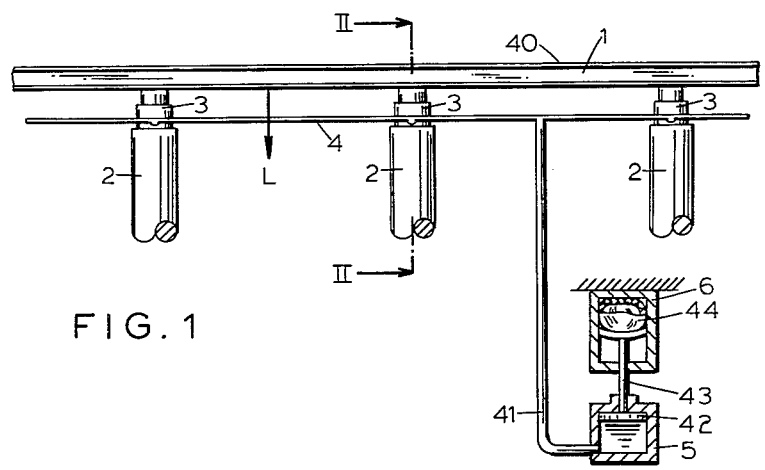
FIG. 1 is a side view of a column-supported track structure embodying a yieldable coupling according to the invention.
Figure 2:
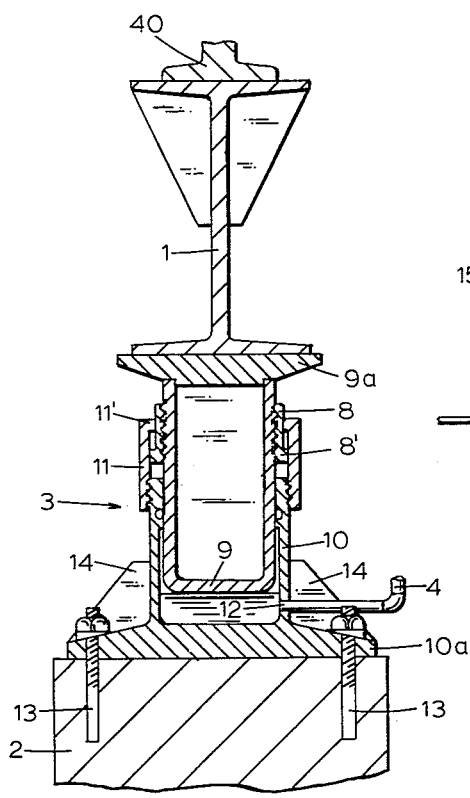
FIG. 2 is an enlarged cross-sectional view taken on the line II—II of FIG. 1.

The structure shown in FIGS. 1 and 2 consists basically of a continuous beam 1 bearing a track 40, and a series of supporting columns 2 which are joined to the beam 1 at longitudinally spaced locations by couplings 3. The couplings are yieldable and permit the beam 1 to be deflected downwardly with respect to support 2 upon the approach of a load, e.g. a rolling crane, indicated by the vertical arrow L. Thus the load L, as it travels along the track, will at any location be borne by more than one support.

FIG. 2 shows that the coupling 3 consists essentially of a vertically movable piston 9 and a bearing plate 9a, the piston being received in a cylinder 10 having a base plate 10a. The bottom of cylinder 10 is joined via a branch pipe 12 to a hydraulic line 4 which, as shown in FIG. 1, may be connected in parallel to a group of couplings on successive supports. The base plate 10a is secured to column 2 by anchor bolts 13. Stiffening fins 14 distribute the load over the base plate when the piston 9 is at its lower limit of travel. The stroke of the piston is determined by an inner ring 8 and an outer ring 11 adjustably screwed onto the outer surfaces of piston 9 and cylinder 10, respectively, ring 8 having a flanged end 8' which coacts with the top of cylinder 10 at the lower end and with a similar flange 11' of ring 11 at the upper end of the piston stroke.

A hydraulic fluid (e.g. oil) from line 4 tends to maintain the piston 9 in its uppermost position, as defined by the positive interengagement of flanges 8' and 11', in which the unloaded or only moderately loaded beam 1 is substantially undeflected as it rests on the supports 2 shown in FIG. 1. The pressure required to sustain the dead weight of the track, and preferably also a part of its live load, in this normal position is derived in the system of FIG. 1 from a master cylinder 5 to which the line 4 is connected by a branch 41 and which has a piston 42 coupled via a rod 43 with a pneumatic cushion constituted by a sealed air bag 44 in a cylinder 6. The air in bag 44 may be under sufficient initial compression to bias the pistons 9 of the associated couplings 3 into their top positions with a force equal to a threshold value of approximately one-half the maximum load pressure; when a load of a weight exceeding this threshold value approaches a column 2, its piston 9 is lowered with only a slight increase in the air pressure of the suitably proportioned pneumatic bag 44 so that no appreciable further loading of the column will ocur. The remainder of the load pressure is then absorbed by the two neighboring columns, each of which thus receives less than the rated value of half the maximum weight even with peak loads.

Figure 3:
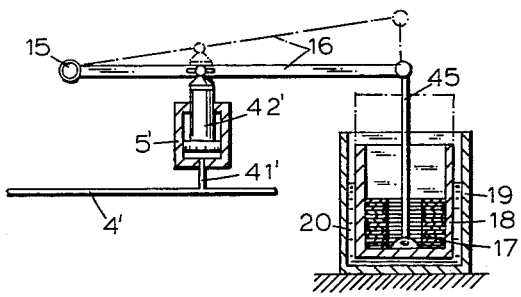
FIG. 3 is a sectional detail view of a modified coupling adapted to be used with the system shown in FIG. 1.

In FIG. 3 the branch 41' of hydraulic line 4' opens into a hydraulic cylinder 5' whose piston 42' is articulated, with suitable play, to a lever 16 having a fixed fulcrum 15. The free end of lever 16 is articulated to a rod 45 which is hinged to a cylindrical body 18 containing a weight 17. The weighted body 18 is partly immersed in a liquid 20, e.g. oil or water, within a vessel 19 so that the weight of that body is reduced by the weight of the displaced liquid; in a limiting case the effective weight of this body may be zero in its illustrated bottom position. As the beam 1 (FIGS. 1 and 2) is deflected under load, the hydraulic pressure communicated to cylinder 5' raises the lever 16, as illustrated in dot-dash lines, so that body 18 with its ballast 17 is partly lifted out of the liquid 20 and its weight increases. Since the deflection of the beam under load will be substantially proportional to the downward pressure of the load, pursuant to Hooke's law, and since the rise of body 18 will be commensurate with this deflection in view of the hydraulic coupling, the increase in the countervailing force applied to lever 16 by that body will be proportional to the deflection stress. In this case, therefore, the bias exerted upon the coupling cylinder 9 (FIG. 2) by the body 18 in its normal immersed position should be substantially less than the aforementioned threshold value of one-half the maximum load weight, the latter value being preferably attained when the body 18 is lifted completely out of the liquid; owing to the relatively small volume of vessel 19, the liquid therein will drop rapidly upon the lifting body 18 so that the balancing force of the coupling will rise sharply from its minimum to its maximum with only a minor initial deflection of the supported rail. If the vessel 19 with its liquid 20 were omitted, the balancing force would be substantially constant within a small range of pivotal motion of lever 16. The cylinder 5' may be individual to a single column 2 or common to a plurality thereof, the same as the cylinder 5 of FIG. 1.

In the embodiment of the invention shown in FIGS. 4 and 5 the coupling elements are of the resilient type. As shown in FIG. 4, a beam 101 is suspended by a series of hangers each including a rod 102 and a rod 102a resiliently interconnected by a spring assembly 22. These hangers depend from the rafters 24 of a shed-type factory roof 23. The continuous beam 101, which serves as a guide rail for a crane or overhead transporter not shown, is directly attached to the lower rods 102a with limited horizontal mobility. As shown in FIG. 5, the upper rod 102 is connected by a threaded sleeve 103 to a bolt 28 which passes through an end plate 30 of a spring housing 32; a coil spring 21 is compressed between plate 30 and an anchor plate 31 which rests on the head 28a of bolt 28. The lower end plate 27 of housing 32 is rigidly joined, e.g. by welding, to the lower rod 102a.

A nut 29, bearing upon end plate 30, engages the bolt 28 and enables adjustment of the initial compression of spring 21. This precompression is advantageously so selected as to correspond, again, to a substantial fraction of the maximum load pressure, e.g. one-half of that pressure. Thus, no relative displacement between rods 102 and 102a will occur until the preadjusted bias of spring 21 is overcome, the system of FIG. 4 behaving up to that point like any conventional rail structure with non-yielding supports.

In the modification of FIG. 6, the single coil spring 21 of FIG. 5 has been replaced by a stack of dished springs 21'. The coupling 22' embodying this spring assembly is otherwise analogous to coupling 22.

Reference is now made to the graph of FIG. 7 for an illustration of the resilient characteristics of the coil spring 21 and the spring assembly 21' represented respectively by curves 33 and 34. The values along the ordinate represent the load pressure P whereas those along the abscissa are the elongation E of the coupling as determined by a compression of its spring or springs. The characteristic 33 of spring 21 is substantially linear, within the range contemplated, and of very low slope, i.e. the spring has a low coefficient of elasticity or stiffness $C=P/E$ so that any increase in pressure in the vicinity of the value $P_{max}/2$ will cause a large additional deflection of the suspended rail, thus distributing the load more evenly onto adjacent supports. At $P_0$ there is indicated the initial spring bias due to the clamping force of nut 28, which determines the threshold value at which this deflection will commence. In the case of spring 21 this bias requires a relatively large precompression $E_0$, whereas in the case of spring assembly 21' the precompression has only a small value $E_0'$ as the curve 34 rises rapidly toward its linear and nearly horizontal portion close to the level $P_{max}/2$; the suspended rail will, therefore, undergo only a slight initial deflection with effective load pressure less than $P_{max}/2$ so that, within the range represented by the steeply ascending branch of curve 34, the structure will behave almost as a conventional crane track with substantially nonyielding suspension rods.

For comparison, I have also shown in FIG. 7 a curve 35 representing the countervailing force exerted by the weighted body 18 of FIG. 3; the slope of the initial portion of this curve will depend upon the relative volumes of body 18 and vessel 19, the combined weight of body 18 and ballast 17 being so selected as to exert upon the piston 9 a balancing force equaling $P_{max}/2$. It will be seen that, under these conditions, the curves 34 and 35 are generally similar to each other.

My invention is, of course, not limited to the specific embodiments described and illustrated but may be realized in a variety of modifications, readily apparent to persons skilled in the art, without departing from the spirit and scope of the appended claims. Thus, for example, the hydraulic liquid in line 4, 12, 43 of FIG. 1 could be replaced in its entirety by a pneumatic fluid (with omission of bag 44), or the pneumatic cylinder 6 could be substituted by a weight such as the body 18 of FIG. 3.

I claim:
1. A track structure for a substantially horizontally displaceable load, comprising a substantially horizontal track-forming beam member, a plurality of substantially fixed supports spacedly positioned along said member, and a coupling individually joining each of said supports to said member; said coupling including a first part fastened to the respective support, a second part vertically movable relatively to said first part and fastened to said member, and balancing means including a counterweight normally maintaining said second part in an elevated position relative to said first part while being yieldable to a downward force equal to a fraction of the maximum downward stress exertable by said load upon said second part, said first and second parts being provided with co-operating formations positively limiting their relative displacement under the force of said counterweight in said elevated position of said second part.

2. A structure according to claim 1 wherein said balancing means exerts a biasing force substantially less than said maximum downward stress upon said second part in said elevated position.

3. A structure according to claim 1 wherein said balancing means further comprises a container for a liquid having said counterweight at least partially immersed therein in the unloaded condition of said coupling, said counterweight being so linked with said second part as to be progressively lifted out of said liquid with increasing depression of said second part.

4. A structure according to claim 3 wherein said container is a vessel surrounding said counterweight with small clearance whereby the level of said liquid drops rapidly upon a lifting of said counterweight from said vessel.

5. A structure according to claim 1 wherein said first and second parts are provided with co-operating formations positively limiting their relative displacement against the force of said balancing means in a relatively lowered position of said second part.

6. A track structure for a substantially horizontally displaceable load, comprising a substantially horizontal track-forming beam member resiliently deflectable under said load in a substantially vertical plane, a plurality of substantially fixed supports spacedly positioned along said beam member, and a coupling individually joining each of said supports to said member, each of said couplings including a first part fastened to the respective support and a second part movable relatively to said first part and fastened to said member, said parts defining between them a chamber of variable volume containing a fluid permitting restricted downward displacement of said second part under the force of said load.

7. A track structure for a substantially horizontally displaceable load, comprising a substantially horizontal track-forming beam member resiliently deflectable under said load in a substantially vertical plane, a plurality of substantially fixed supports spacedly positioned along said beam member, a coupling individually joining each of said supports to said member, each of said couplings including a first part fastened to the respective support and a second part movable relatively to said first part and fastened to said member, said parts defining between them a chamber of variable volume containing a fluid permitting restricted downward displacement of said second part under the force of said load, and conduit means interconnecting said chambers in parallel to effect a distribution of the downward force of said load to supports remote from said load upon downward displacement of one of said second parts in the region of said load.

8. A track structure for a substantially horizontally displaceable load, comprising a substantially horizontal track-forming beam member resiliently deflectable under said load in a substantially vertical plane, a plurality of substantially fixed supports spacedly positioned along said beam member, a coupling individually joining each of said supports to said member, each of said couplings including a first part fastened to the respective support and a second part movable relatively to said first part and fastened to said member, said parts defining between them a chamber of variable volume containing a fluid permitting restricted downward displacement of said second part under the force of said load, conduit means interconnecting said chambers in parallel to effect a distribution of the downward force of said load to supports remote from said load upon downward displacement of one of said second parts in the region of said load, and balancing means operatively coupled with said conduit means for compensatingly increasing the pressure in said chambers upon downward displacement of said second parts.

References Cited in the file of this patent

UNITED STATES PATENTS

| | | |
|---|---|---|
| 688,522 | Horner | Dec. 10, 1901 |
| 1,109,862 | Myers | Sept. 8, 1914 |
| 1,845,912 | Gilbert | Feb. 16, 1932 |
| 2,432,717 | Berger | Dec. 16, 1947 |

FOREIGN PATENTS

| | | |
|---|---|---|
| 382,698 | Great Britain | Nov. 3, 1932 |